Dec. 13, 1938.                 J. S. CARPENTER                2,139,932
                                  TURBINE
                              Filed Nov. 10, 1937
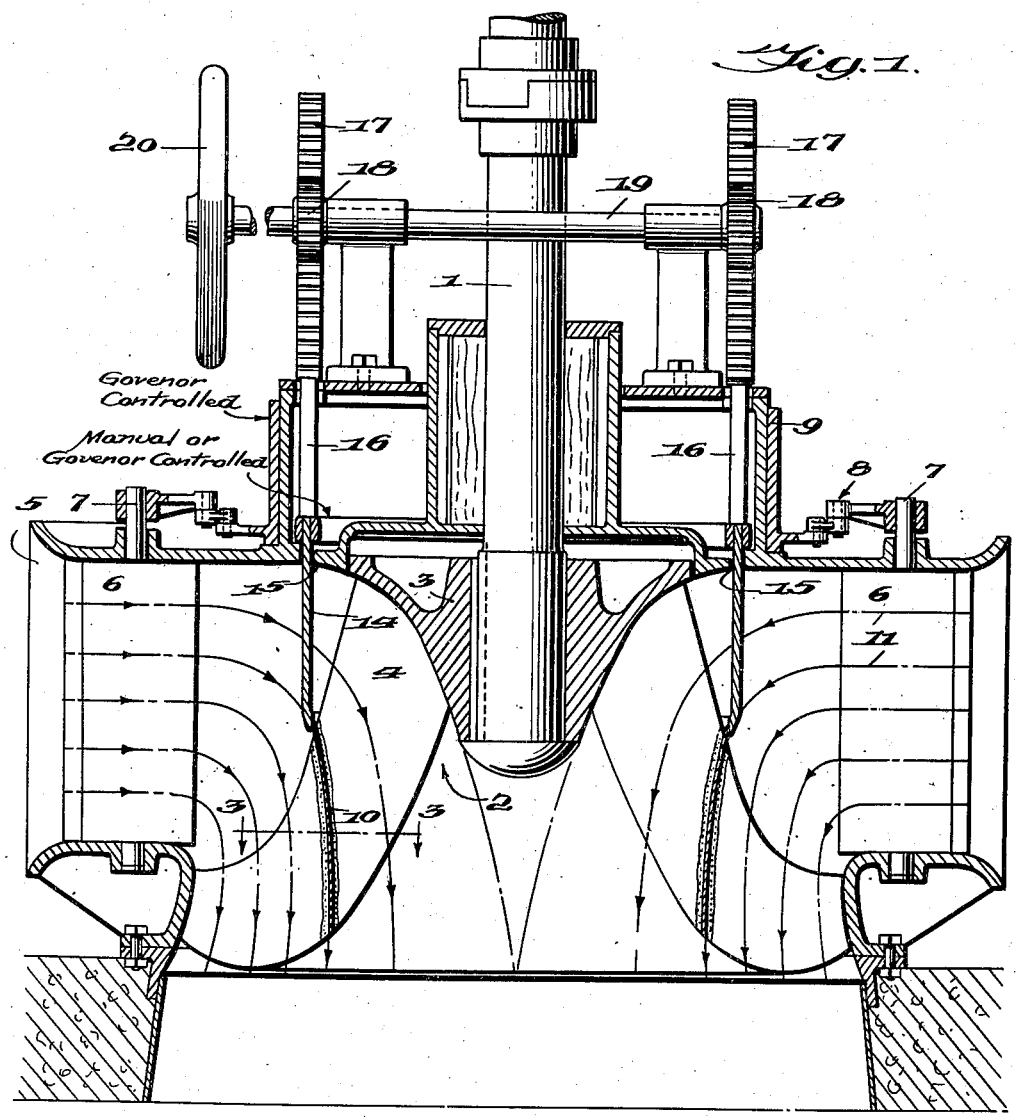
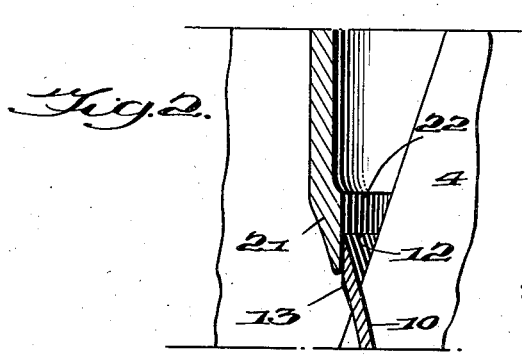
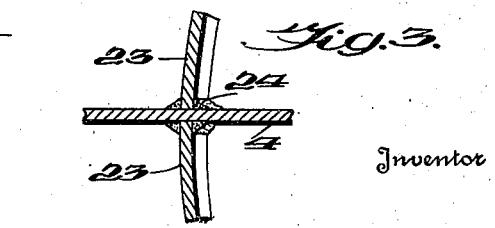
Inventor
John S. Carpenter,
By Smith, Michael and Gardiner
Attorney Patented Dec. 13, 1938

2,139,932

UNITED STATES PATENT OFFICE 2,139,932

TURBINE

John S. Carpenter, Athol, Mass., assignor to Rodney Hunt Machine Company, Orange, Mass.

Application November 10, 1937, Serial No. 173,939

9 Claims. (Cl. 253—121)

This invention relates generally to high speed, high power Francis type water turbines, and is more particularly concerned with means for controlling the flow of water to and the distribution of water in runners of such turbines.

It is well known that the efficiency of turbines of this type drops with decreasing load on the turbine. This decrease in efficiency increases rapidly as the load falls below eighty percent of full load until at about fifty percent of full load the efficiency may be only approximately seventy percent. Furthermore, experience shows that the efficiency for loads approximating fifty percent becomes less as the specific speed of the turbine increases. It might be here stated that high specific speed turbines such as here referred to may be defined as those having a specific speed of one hundred revolutions per minute for one horse-power turbine at one foot head, and above; it being noted that the runners for such turbines are generally characterized by having ten vanes or less.

The loss in efficiency above referred to, which occurs at fractional loads, is due in part to the fact that the flow through the turbine adjacent the runner hub becomes unstable as the load on the turbine is reduced, so that the turbine, originally designed to operate as a fully filled pressure reaction turbine, is subject to conditions closely approximating those obtaining in an inefficient impulse wheel as the pressure within the runner is progressively reduced by closing the wicket gates in response to falling load. It is an object of the present invention to so control the flow of water to and the distribution of water in the runner under conditions of partial load to correct the conditions which are responsible for the above recited factors which contribute to loss in efficiency under the conditions noted.

Another object of my invention is to provide a runner for high speed Francis type turbines in which the wetted area of the band or rim of the conventional Francis runner is substantially reduced and to position such band so that the frictional losses due to rubbing are correspondingly reduced.

Another object of the invention is to construct a high specific speed type runner so that the bending moment upon the runner vanes at the portion adjacent the hub is substantially reduced.

Another object of the invention is to control the flow of fluid through the runner in a manner such that at fractional loads the flow may be restricted to a portion only of the runner so that the flow will not be substantially different than that for which the runner was designed, thereby avoiding eddying and secondary whirls parasitic to the main power producing function of said runner.

Another object of my invention is to improve the governing characteristics of high specific speed runners by stabilizing the rotative speed of the runner as the same is brought up to synchronizing speed with respect to other turbines in operation, and under load, by confining the flow to a portion only of the runner.

Other objects of the invention will become apparent from a consideration of the following specification when considered in the light of the accompanying drawing, wherein preferred embodiments of my invention have been illustrated. It is to be understood, however, that the embodiments illustrated in the accompanying drawing are but for the purpose of example only and that the novel and important features of my invention are set forth more clearly in the appended claims.

In the accompanying drawing:

Figure 1 is a vertical sectional view through a Francis type high specific speed turbine equipped with a preferred form of fluid control and distributing means forming the subject-matter of my invention.

Fig. 2 is a detailed sectional view showing the relationship between the partition ring and the cylindrical gate.

Fig. 3 is a detail sectional view of a preferred form of construction by which the partition ring and vanes may be interconnected.

Referring more particularly to the accompanying drawing, in Fig. 1, I have shown a high specific speed Francis type water turbine including a vertically disposed runner shaft 1 carrying at the lower end thereof a typical high speed runner indicated generally by the reference character 2. The runner 2 comprises a central hub 3 secured to the shaft 1 by any conventional means. The hub carries the usual vanes 4 which, as shown, depend downwardly and extend radially outwardly from the hub 3. As previously stated, in runners of this type the number of vanes is ten or less. The runner 2 is surrounded by a conventional distributing ring 5 in the throat of which are mounted conventional wicket or control gates 6. The gates 6, as shown, are mounted for pivotal movement about a vertical axis 7 and may be connected by any suitable linkage 8 to a ring member 9, the latter being controlled in any suitable and well known manner by a governor (not shown) whereby the gates 6 are opened and closed in response to variations in load on the turbine. The elements of the turbine thus far referred to are conventional and in accordance with well known present day practice.

As previously stated, my invention contemplates controlling the flow of fluid to and distribution of fluid in a high specific speed runner so that the usual losses incident to operation of conventional turbines of this type at fractional loads are avoided. To this end I provide the runner 2 intermediate the hub portion 3 and the outer periphery of the vanes 4 with a dividing or partition ring 10. The ring 10 and the vanes 4, as shown, are arranged in intersecting relationship, the lower edge of the ring coinciding substantially with the trailing edges of the vanes with the ring 10 and the vanes 4 intersecting throughout the entire axial extent of the vanes. Furthermore, the ring 10 is arranged concentrically of the common axis and is transversely curved so that the inner and outer surfaces thereof coincide substantially with the theoretical lines of flow for maximum efficiency such as indicated by the lines 11. The lines 11 may be readily calculated for a given installation, by methods which are well known to those skilled in the art.

The ring 10 extends appreciably above the leading edges of the vanes 4 and as shown more clearly in Fig. 2, terminates in a beveled edge 12 which is formed by a substantially cylindrical surface 13 at the extreme upper and outer face of the ring 10. The surface 13, as stated, is cylindrical and concentric with respect to the axis of rotation of the runner. The radius of the ring 10 is determined primarily by the load conditions under which the turbine is to operate and may be disposed with reference to the axis of the runner so that it divides the runner into two portions of substantially the same power or, if desired, into sections bearing any predetermined relation with respect to each other. In practice it has been found that a ring positioned so that that portion of the runner projecting beyond the ring will drive the turbine for loads between one-half and one-third of rated full load is satisfactory.

For the full realization of my invention I provide an auxiliary fluid control gate 14. The gate 14 as shown more clearly in Fig. 1, is substantially cylindrical and disposed concentric with respect to the shaft 1. The gate 14 is mounted for movement axially of the shaft 1 and to this end may be conveniently arranged to move through a circular slot or opening 15 provided in the upper wall of the distributor 5. Any convenient means may be employed for raising or lowering the gate 14 and by way of example only I have shown the gate provided with upwardly extending members 16 positioned at substantially diametrically opposed points on the upper edge of the gate 14. The members 16 carry adjacent their upper ends rack members 17 with which mesh the pinions 18 suitably secured to a cross shaft 19. Shaft 19 may be manually controlled by hand wheel 20 or, if desired, said shaft may be operated automatically in response to the governor (not shown) in any convenient manner. Or if desired, in lieu of the shaft 19 and the gears and racks 17 and 18, the ring 14 might be provided with one or more pistons operating within cylinders to which the flow of motive fluid is controlled by governor actuated means in a known manner such as shown in the patent to Moody 1,703,081. The means per se employed for actuating and controlling the gate 14, forms no part of the present invention.

The gate 14, as shown, is substantially cylindrical and is dimensioned so that in its operative or lowered position, such as shown in Fig. 1, it will cooperate with the upper edge 12 of the ring 10 to effectively mask the upper and inner portion of the runner so that water flowing through the gates 6 will be directed through and confined to the unmasked portion of the runner vanes extending below the ring 10. In order to provide minimum losses at the juncture between the lower end of the gate 14 and the upper end of the ring 10, the gate is beveled as at 21, the angularity of said bevel being such as to substantially merge into and coincide with the curved outer face of the ring 10, as shown. The inner surface 22 of the lower edge of the gate 14 is substantially cylindrical and concentric with the axis of the runner and of a diameter such as to surround and lie closely adjacent to the cylindrical portion 13 of the ring. By this construction the incoming water is directed through the outer periphery only of the runner and in a manner to preserve substantially the theoretical flow lines for maximum efficiency.

The ring 10 and the vanes 4 may be interconnected in any suitable manner such as by casting the ring and vanes integrally with the hub 3 or, if desired, the ring 10 may be comprised of a plurality of separate complemental arcuate sections 23, which, as shown in Fig. 3, may be welded to the several vanes 4 as indicated at 24.

It is to be understood, of course, that the gate 14 is only utilized to control the flow of water to the runner in the fully lowered position shown in Fig. 1 and when inoperative, is raised so as to completely expose the runner to the action of the incoming water.

In operation it will be understood that so long as the turbine is operating under substantially full load the admission of motive fluid thereto is under control of the wicket gates 6 which are moved from open to partly closed position in response to movements of the governor. During such operation the cylindrical gate 14 is maintained in the fully elevated position, in which position the entire runner is open to receive water from the distributor. When the load on the turbine falls appreciably, such as below 75 percent of full load, the cylindrical gate 14 may be moved to the position shown in Fig. 1 either manually or automatically under the control of the governor. It will be understood that the wicket gates being under the control of the governor are in partially closed position when the load on the turbine falls, and this position of the wicket gates is undisturbed by the lowering of the gate 14 so that by restricting the flow of fluid to that portion of the runner lying beyond the partition ring 10, the pressure within the runner is maintained at a value approximating that obtaining in the runner when operating under a full load, with the result that the increased tangential velocity component due to the water entering through partly closed wicket gates is realized to the fullest extent.

In view of the foregoing description it is at once apparent to those skilled in the art that by positioning the ring 10 substantially inwardly from the extreme outer periphery of the runner, the total wetted area of the ring is substantially reduced when compared with conventional installations in which the ring is located at the extreme outer periphery of the runner. Also, it will be noted that by positioning the ring 10 intermediate the ends of the runner and the hub, the velocity thereof is substantially reduced and this in turn appreciably lowers the friction incident to rubbing between the ring and the water. The position of the ring as described is also of advantage in relieving those portions of the vanes adjacent to the hub from the stresses and strains incident to blade flexure in runners where no such ring is provided or in runners wherein the ring is placed at the extreme outer periphery of the runner.

Furthermore, it is apparent that the foregoing construction provides means for maintaining at fractional loads in a continuously open portion of the runner, flow conditions approximating those for which the runner was designed to operate, thus avoiding the losses due to eddying and secondary whirls parasitic to the main power producing function of said runner which characterize operation of conventional turbines of this type under reduced loads. In this same connection it is to be noted that the control and distribution of the water in the manner described is of considerable importance where a turbine is to be synchronized with turbines already connected to a load, in that by masking the upper and inner portion of the runner in the manner noted, the speed of the unloaded turbine when being brought to synchronizing speed, is substantially stabilized and the turbine thus protected against surges in rotative speed due to reduced pressure within the runner and parasitic whirls and eddies.

It is further to be noted that the particular combination of flow control instrumentalities herein described is effective in making it possible to utilize to the fullest extent the increased tangential velocity component due to the water entering the runner through partly closed wicket gates when the cylindrical gate is lowered to mask the upper and inner portion of the runner. The increased tangential velocity component due to partly closed wicket gates is well known but in conventional turbines of present design it is impossible to realize the benefits accruing therefrom when the turbines are operating under reduced load due to the fall of pressure in the partly filled runner when operating under fractional loads. In the present instance, by masking a portion of the runner with the cylindrical gate and dividing ring, the pressure within the operating portion of the turbine is maintained so that the full benefit of increased tangential velocity component due to partially closed wicket gates may be realized to the fullest extent.

Having thus described my invention what I claim as new and desire to secure by Letters Patent is:

1. In a turbine including a runner, a distributor for delivering motive fluid radially inwardly to said runner, wicket gates pivotally mounted within the distributor, and means to open and close said gates in response to variation of load on the turbine, the combination with said gates and runner of an axially movable cylindrical gate having a diameter substantially less than the maximum diameter of the runner and disposed concentrically with respect to the runner and means to move the cylindrical gate axially of the runner to selectively position the gate to surround and mask a portion of the runner adjacent one end thereof or to a position clear of the runner, said gate in the runner masking position confining the flow of fluid through the runner to that portion of the runner lying outside the confines of the cylindrical gate while maintaining full delivery capacity of the distributor as defined by said wicket gates.

2. In a turbine including a vertical shaft, a runner carried by the shaft, a distributor for delivering motive fluid radially inwardly to said runner, wicket gates pivotally mounted within the distributor, and means to open and close said gates in response to variation of load on the turbine, the combination with said gates and runner of an axially movable cylindrical gate having a diameter substantially less than the maximum diameter of the runner and disposed concentrically with respect to the runner and means to move the cylindrical gate axially of the runner to selectively position the gate to surround and mask a portion of the runner adjacent the runner shaft, said gate in the lower masking position confining the flow of fluid through the runner to the lower portion thereof lying outside the confines of the cylindrical gate while maintaining full delivery capacity of the distributor as defined by said wicket gates, in such a manner so as to preserve substantially the same paths of flow as those for which the runner was designed.

3. In a reaction type turbine including a main runner having radially extending vanes, a distributor for delivering motive fluid radially inwardly to said runner, the combination with said runner of a partition ring carried by said runner intermediate the radial extent of said vanes, an axially movable cylindrical gate concentrically disposed with respect to the axis of the runner and means for moving the gate axially of the runner into and out of telescopic relation with said runner, said gate and ring being cooperatively dimensioned to effectively mask and seal that portion of the runner lying within the ring when the gate is moved into telescopic relation with a runner while maintaining full delivery capacity of the distributor whereby to insure maximum pressure within the unmasked portion of the runner.

4. In a reaction type turbine including a main runner having radially extending vanes, a distributor for delivering motive fluid radially inwardly to said runner, the combination with said runner of a partition ring carried by said runner intermediate the radial extent of said vanes, an axially movable cylindrical gate concentrically disposed with respect to the axis of the runner and means for moving the gate axially of the runner into and out of telescopic relation with said runner, said gate and ring being provided with portions which, when the gate is lowered into operative position, overlap longitudinally of the runner axis so that that portion of the runner lying between the ring and the axis of the runner is completely masked and effectively sealed whereby the flow of fluid is restricted to that portion of the runner lying outside of the ring while maintaining full delivery capacity of the distributor whereby to insure maximum pressure within the unmasked portion of the runner.

5. A runner for high specific speed reaction turbines comprising a hub member, radially disposed vanes carried by said hub member and a partition ring disposed concentrically of the axis of the runner intermediate the hub and the outer periphery thereof, said ring member and vanes being arranged in intersecting relationship for the full axial extent of the vanes, said ring member being curved transversely so that the outer surfaces thereof are in substantial coincidence with the theoretical flow lines of maximum efficiency for the runner, said ring member extending appreciably beyond the leading edges of the vanes and said extended portion being provided with a cylindrical surface concentric with the axis of the runner adapted to cooperate with a cylindrical gate member.

6. In a reaction type turbine including a vertical shaft, a runner mounted on said shaft and including radially disposed vanes, a distributor for delivering fluid radially inwardly to said runner, wicket gates for controlling the flow of fluid through said distributor in response to variations of load on the turbine, and means for actuating said wicket gates, the combination with said gates and runner of a partition ring carried by the runner in intersecting relationship with the vanes throughout the full axial extent of the vanes at the point of intersection with the ring, said ring extending above the leading edges of the vanes concentrically with respect to the axis of the runner, a cylindrical gate having a diameter substantially less than the maximum diameter of the runner and mounted for movement axially of the runner, and means for moving the gate from a position entirely clear of the runner to a position enclosing the upper and inner portion of the runner with the lower edge of said cylindrical gate and the upper edge of the partition ring in overlapping relation whereby to restrict the flow of fluid to that portion of the runner lying beyond the partition ring while maintaining full delivery capacity of the distributor as defined by said wicket gates.

7. A runner for high specific speed reaction type turbines comprising a hub member, vane members carried by said hub member and extending radially thereof, a partition ring carried by the runner concentrically with respect to the axis thereof and in intersecting relationship with the vanes throughout the full axial extent thereof at the point of intersection with the ring, said ring comprising a plurality of complemental sections disposed between and secured to the respectively adjacent vanes, each of said sections being arcuately curved about the axis of the runner and transversely curved to correspond substantially with the theoretical flow lines for maximum efficiency of the runner, and each of said sections being provided at the upper edge thereof with a portion extending above the leading edges of the adjacent runner vanes, the said portions of the several sections cooperating to define a substantially cylindrical surface concentric with the axis of the runner and adapted to cooperate with a cylindrical gate member.

8. In a reaction type turbine including a main runner having radially extending vanes, a distributor for delivering motive fluid radially inwardly to said runner, the combination with said runner of a partition ring carried by said runner, intermediate the radial extent of said vanes, an axially movable cylindrical gate concentrically disposed with respect to the axis of the runner and means for moving the gate axially of the runner into and out of telescopic relation with said runner, said gate and ring being provided with portions which, when the gate is lowered into operative position, overlap longitudinally of the runner axis, said overlapping portions of the cylindrical gate and ring members being provided with opposed cylindrical surfaces substantially concentric to the axis of said runner and dimensioned to form a snug running fit whereby to completely mask and effectively seal that portion of the runner lying between the ring and the axis of the runner while maintaining full delivery capacity of the distributor to insure maximum pressure within the unmasked portion of the runner.

9. In a reaction type turbine including a main runner having radially extending vanes, a distributor for delivering motive fluid radially inwardly to said runner, the combination with the runner of a partition ring carried by said runner intermediate the radial extent of said vanes, said ring being curved arcuately to conform substantially to the theoretical flow lines of maximum efficiency for the runner, an axially movable cylindrical gate member mounted concentrically with respect to the axis of the runner and means for moving the gate member axially of the runner into and out of telescopic relation with the ring member, that portion of the outer surface of the gate adjacent the ring member being beveled to correspond substantially to the transverse arc of curvature of said ring member.

JOHN S. CARPENTER.